US008191899B2

(12) United States Patent
Droscher et al.

(10) Patent No.: US 8,191,899 B2
(45) Date of Patent: Jun. 5, 2012

(54) APPARATUS FOR ROTATIONALLY FIXING A SEAL RING OF A MECHANICAL SEAL ASSEMBLY AXIALLY MOVABLY RETAINED AT A MOUNTING COMPONENT

(75) Inventors: Peter Droscher, Geretsried-Gelting (DE); Armin Laxander, Ebenhausen (DE); Günther Lederer, Geretsried (DE); Petia Philippi, Wolfratshausen (DE); Andreas Schrüfer, Wolfratshausen (DE)

(73) Assignee: Eagleburgmann Germany GmbH & Co., KG, Wolfratshausen (DE)

( * ) Notice: Subject to any disclaimer, the term of this patent is extended or adjusted under 35 U.S.C. 154(b) by 602 days.

(21) Appl. No.: 12/313,108

(22) Filed: Nov. 17, 2008

(65) Prior Publication Data

US 2009/0152818 A1 Jun. 18, 2009

(30) Foreign Application Priority Data

Nov. 23, 2007 (DE) ................. 20 2007 016 406 U

(51) Int. Cl.
*F16J 15/34* (2006.01)
(52) U.S. Cl. ........................... 277/372; 277/358
(58) Field of Classification Search .......... 277/348, 277/358, 372, 375, 377
See application file for complete search history.

(56) References Cited

U.S. PATENT DOCUMENTS

| 2,996,319 | A |   | 8/1961  | Copes |         |
|-----------|---|---|---------|-------|---------|
| 3,479,039 | A |   | 11/1969 | Pinkas |        |
| 4,418,920 | A | * | 12/1983 | Belter | 277/372 |
| 5,199,172 | A |   | 4/1993  | Runowski |      |
| 6,076,830 | A |   | 6/2000  | Wu et al. |     |
| 6,494,460 | B2 |  | 12/2002 | Uth |            |
| 6,935,632 | B2 | * | 8/2005 | Azibert et al. | 277/370 |
| 2006/0232015 | A1 | * | 10/2006 | Lederer et al. | 277/362 |

FOREIGN PATENT DOCUMENTS

| DE | 92 192 923 U1 | 1/1993 |
| DE | 692 18 599 T2 | 11/1997 |
| DE | 201 10 824 U1 | 11/2001 |
| DE | 20 2005 001 061 U1 | 5/2005 |
| EP | 0591586 | 4/1994 |

OTHER PUBLICATIONS

European Search Report dated Apr. 2, 2009 for Application No. EP08019678.5.
German Search Report dated Jun. 25, 2008.

* cited by examiner

*Primary Examiner* — Gilbert Lee
(74) *Attorney, Agent, or Firm* — Edwards Wildman Palmer LLP; Scott D. Wofsy; Lisa Swiszcz

(57) ABSTRACT

The present invention refers to an apparatus for rotationally fixing a seal ring (4) of a mechanical seal assembly retained at a mounting component (1) to be axially movable, comprising a force transmitting ring (10) retained at the mounting component to be axially movable and a rotation prevention device comprising at least one first engaging member (17) configured to engage with the mounting component and the force transmitting ring in a form-fit manner and at least one second engaging member (18) configured to engage with the force transmitting ring and the seal ring in a form-fit manner, the first engaging member being arranged circumferentially offset with respect to the second engaging member, characterized in that the engaging members (17, 18) protrude axially from the force transmitting ring (10) or the seal ring (4) toward the respectively other component (seal ring or force transmitting ring) and are configured to be received in axial recesses (19, 20) provided in the respectively other component with a play.

9 Claims, 1 Drawing Sheet

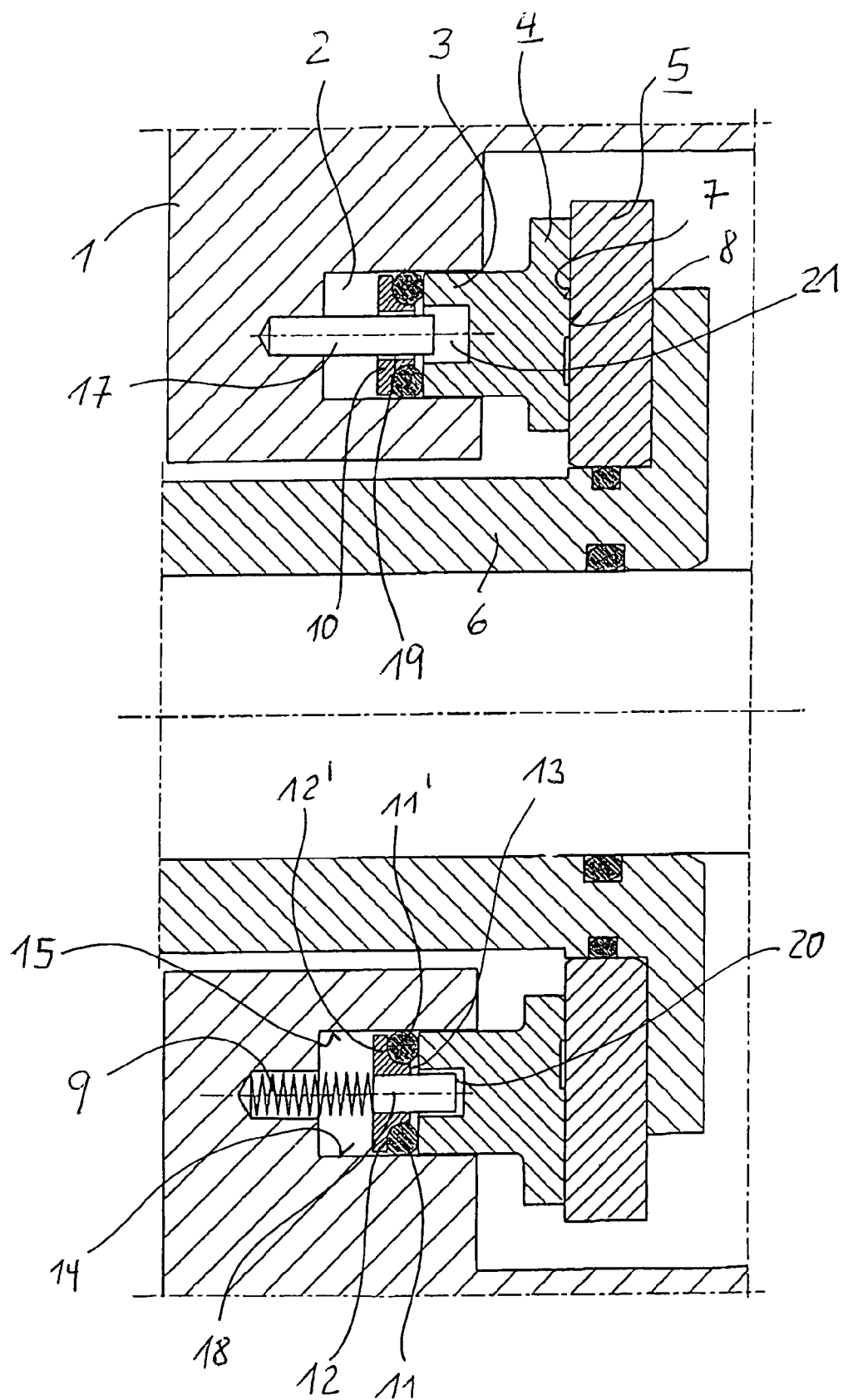

APPARATUS FOR ROTATIONALLY FIXING A SEAL RING OF A MECHANICAL SEAL ASSEMBLY AXIALLY MOVABLY RETAINED AT A MOUNTING COMPONENT

The invention relates to an apparatus for rotationally fixing a seal ring of a mechanical seal assembly, the seal ring being retained at a mounting component to be axially movable, and in particular such an apparatus comprising a force transmitting ring being retained at a mounting component to be axially movable and a rotation prevention device having at least one first engaging member configured to engage in a form-fit manner with the mounting component and the force transmitting ring and at least one second engaging member configured to engage in a form-fit manner with the force transmitting ring and the seal ring, wherein the first engaging member is arranged circumferentially offset with respect to the second engaging member. Such an arrangement is basically known from U.S. Pat. No. 3,479,039 A.

In such a known arrangement, flaps radially protruding from the force transmitting ring engage in grooves in the seal ring on the one hand and in grooves in the mounting component on the other hand, in order to transmit a torque acting on the seal ring to the housing and to therewith prevent the seal ring from rotating with respect to the housing. The axial mobility of the force transmitting ring is restricted in such an arrangement, and in addition, the arrangement requires high efforts with regard to assembly and maintenance. In addition, the function of the force transmitting ring is naturally only restricted to the transmission of the biasing force to the seal ring. Similar rotationally fixing means being effective through positive locking are also known, e.g. in the form of radial engaging pins engaging in axial grooves in the periphery of the seal rings. A common feature of the known arrangements is a relatively clear attenuation of the seal ring by the grooves or engaging members to be provided. Further, the mobility of the seal ring in an axial direction can be restricted or affected with respect to the stretch of way as well as by frictional effects.

It is therefore an object underlying the present invention to provide a rotationally fixing device of the generic kind, which enables minimizing of the constructional length of the mechanical seal assembly while minimally weakening the cross-section of the seal ring. In addition, the device shall feature a minimum of assembly and maintenance efforts and enable a functional expansion of the function of the force transmitting ring.

This object is solved by the features of claim 1.

It is a feature of the invention that the engaging members, contrary to the known arrangements, do not extend radially but axially. The torque transmission from the seal ring to the mounting component (e.g. housing) is performed in two steps, in that the torque is at first transmitted from the seal ring to the force transmitting ring and then from the force transmitting ring to the housing at a location arranged circumferentially offset. The axially extending engaging members engage in shallow boreholes or recesses in the force transmitting ring or seal ring, such that the seal ring is only marginally weakened and simple constructive measures are sufficient for the rotational fixation at the seal ring. Due to the invention, a substantial reduction of the constructional length of the mechanical seal assembly is enabled, without any restriction of the mobility of the seal ring in an axial direction. In addition, the freely movable force transmitting ring may assume the further function of receiving a secondary sealing assembly for sealing the seal ring with respect to the mounting component, due to the lack of radial engaging flaps or the like.

According to a preferred embodiment of the invention, at least one annular sealing member made of an elastic material is provided at the force transmitting ring near the end face thereof facing the seal ring: In this context, the sealing member may sealingly engage with a guiding surface of the mounting component, along which the force transmitting ring is axially guided. With these measures, it is provided that no cross-section weakening grooves for receiving the secondary sealing members, e.g. O-rings, have to be positioned at the seal ring itself, such that the mobility of the seal ring is also promoted.

Concerning the other embodiments, reference is made to the claims.

BRIEF DESCRIPTION OF THE DRAWING

FIG. 1 is a longitudinal cross-sectional view, partly simplified, of an exemplary embodiment of a rotation prevention device constructed in accordance with the present invention.

DETAILED DESCRIPTION

In the following, the invention is explained in more detail based on the drawing which shows a longitudinal cross-sectional view, partly simplified, of a preferred embodiment of a rotation prevention device according to the invention.

In the drawing, reference numeral 1 designates a stationary component, in particular the housing of a mechanical seal assembly, and reference numeral 2 designates a guiding ring space or an annular recess having an end-side open end being positioned axially in the housing, into which end an axial lug portion 3 of a rotationally fixed but axially movable seal ring 4 protrudes, such that the seal ring 4 is retained and axially guided in the guiding ring space 2.

The rotationally fixed seal ring 4 co-operates with a seal or counter ring 5 which is mounted on a sleeve 6 for a common rotation, which sleeve may be placed on and assembled with a rotary component (shaft) to rotate therewith. Upon rotation of the rotating component, also the seal ring 5 is caused to equally rotate, whereas the seal ring 4 is retained rotationally fixed with respect to the housing 1 by means which are described in more detail in the following.

The seal rings 4, 5 have opposite sliding or sealing surfaces 7, 8, between which a sealing gap is formed during operation, in order to seal the surroundings at one periphery with respect to the surroundings at the other periphery of the pair of seal rings. Upon standstill of the mechanical seal assembly, the sealing surfaces 7, 8 are maintained in a mutual sealing engagement due to a biasing force. For this purpose, a biasing device 9 is provided, which may be one or a plurality of biasing springs circumferentially arranged about the guiding ring space 2.

The biasing force of the biasing device 9 does not act directly on the seal ring 4, but through a force transmitting ring 10 which is arranged in the guiding ring space 2 to be axially movable. On axial end of the biasing device 9 is supported at the force transmitting ring 10 and the other axial end thereof is supported at the housing 1. Due to the effect of the biasing force, the force transmitting ring 10 experiences an axial movement in the guiding ring space 2 toward the adjacent face end of the seal ring 4, such that the biasing force is transmitted to the seal ring.

The force transmitting ring 10 may comprise a pair of sealing members 11, 11' made of an elastic material, such as an elastomer, to seal the seal ring 4 with respect to the housing 1. Preferably, the sealing members 11, 11' are commercially available O-rings which are arranged in circumferentially extending recesses 12, 12' having a cross-section adapted to the cross-sectional configuration of the sealing members 11, 11', e.g. a pitch-circular cross-section, in a corner region between the outer and inner peripheries and an end face 13 of the force transmitting ring 10 facing the seal ring 4, such that the cross-section of each sealing member 11, 11' protrudes axially beyond the end face 13 by a suitable small distance. Preferably, the sealing members 11, 11' also protrude beyond the outer and inner peripheries of the force transmitting ring 10 by a small distance.

The sealing members 11, 11' are configured to engage with adjacent inner and outer peripheral surfaces 14, 15 of the guiding ring space 2 when the sealing members 11, 11' experience a radial expansion due to an axial force being exerted. Without said axial force, no engagement or only a very small engagement of the sealing members 11, 11' with the peripheral surfaces 14, 15 occurs, such that the axial mobility of the force transmitting ring 10 is not affected under these conditions.

According to the invention, a rotation prevention device is provided to retain the seal ring 4 rotationally fixed with respect to the housing 1, without the axial mobility of the components being restricted. The inventive rotation prevention device comprises first and second engaging members 17, 18 which prevent the force transmitting ring 10 from rotating with respect to the housing 1 or prevent the seal ring 4 from rotating with respect to the force transmitting ring 10, respectively. As is shown, the first engaging member 17 is configured to be a cylindrical member which protrudes axially into the guiding ring space 2 by a suitable axial distance and is retained fixedly, e.g. by press-fit, in a blind hole of the housing 1.

In the force transmitting ring 10, a recess or bore 19 is provided in axial alignment with the engaging member 17, into which bore the engaging member 17 may extend upon an axial movement of the force transmitting ring 10, wherein the engaging member 17 is received in the recess 19 with a play, as it is shown in the upper portion of the FIGURE.

The second engaging member 18 may also be a cylindrical member which is force-fit retained in a fit bore in the force transmitting ring 10 and protrudes axially from the force transmitting ring 10 toward the seal ring 4 by a suitable axial distance which, however, should be shorter than the axial extending distance of the first engaging member 17.

In the seal ring 4, a recess 20 aligned with the second engaging member 18 is provided, in which recess the second engaging member 18 can be received with a play upon a corresponding positional relation between the force transmitting ring 10 and the seal ring 4, as it is shown in the lower portion of the FIGURE.

As is further shown in the upper portion of the FIGURE, a further recess 21 aligned with the first engaging member 17 may be provided in the seal ring 4, into which recess an end portion of the first engaging member 17 may protrude, when the first engaging member 17 protrudes beyond the end face 13 of the force transmitting ring 10 facing the seal ring 4, which may be the case if the components assume the mutual positions shown in the upper portion of the FIGURE. The first engaging member 17 should be received in the recess 21 of the seal ring 4 with a larger play as is the case with the second engaging member 18 with respect to the recess 20 of the seal ring 4. Due to these measures, a possibly rigid, wedged positioning of the seal ring 4 with respect to the force transmitting ring 10 is prevented. Both recesses 20, 21 provided in the seal ring 4 on its face end side facing the force transmitting ring 10 may have a minimal depth due to the inventive embodiment of the rotational fixation, such that the seal ring 4 is not or only marginally weakened.

Preferably, a plurality of circumferentially spaced first engaging members 17 and an identical or different plurality of circumferentially spaced second engaging members 18 are provided, wherein the first and second engaging members 17, 18 are provided at circumferentially offset locations. The recesses 19 or 20 and 21 in the force transmitting ring 10 or the seal ring 4, respectively, are correspondingly provided in the respective component in a manner aligned with the respective engaging members 17, 18.

Although the aforementioned embodiment describes a rotational fixation of the seal ring 4 with respect to a stationary housing 1, the inventive rotational fixation may, if desired, also be provided at the rotating seal ring 5, if it is desired that same shall be maintained axially movable with respect to the rotating component (shaft), in addition to its rotations.

The invention claimed is:

1. An apparatus for rotationally fixing a seal ring of a mechanical seal assembly retained at a mounting component to be axially movable, comprising a force transmitting ring retained at the mounting component to be axially movable and a rotation prevention device comprising at least one first engaging member configured to engage with the mounting component and the force transmitting ring in a form-fit manner and at least one second engaging member configured to engage with the force transmitting ring and the seal ring in a form-fit manner, the first engaging member and the second engaging member being circumferentially aligned and being spaced apart along the same circumference, wherein the first engaging member protrudes axially from the mounting component towards the force transmitting ring and is configured to be received in an axial recesses provided in the force transmitting ring with a play, and the second engaging member protrudes axially from the force transmitting ring towards the seal ring and is configured to be received in an axial recess provided in the seal ring with a play.

2. The apparatus of claim 1, wherein the first engaging member is configured to be received simultaneously in mutually aligned recesses in the force transmitting ring and the seal ring.

3. The apparatus of claim 1, wherein a plurality of mutually circumferentially offset first engaging members and a plurality of mutually circumferentially offset second engaging members offset with respect to the first engaging members are provided, to which a corresponding plurality of axial recesses in the force transmitting ring and the seal ring are assigned, wherein the first engaging members are configured to be simultaneously received in mutually aligned recesses in the force transmitting ring and the seal ring.

4. The apparatus of claim 1, wherein each first and second engaging member is formed cylindrically and is retained in the force transmitting ring or the mounting component by press-fit.

5. The apparatus of claim 1, wherein at least one annular sealing member made of an elastic material is provided at the force transmitting ring near its end face facing the seal ring, wherein the sealing member is configured to sealingly engage with a guiding surface of the mounting component, along which surface the force transmitting ring is axially guided.

6. The apparatus of claim 1, further comprising a biasing device disposed between the mounting component and the force transmitting ring, to thereby bias the force transmitting ring axially against the seal ring.

7. The apparatus of claim 1, wherein the mounting component comprises a guiding ring space in which the force transmitting ring and at least a portion of the seal ring is received to be axially movable.

8. The apparatus of claim 1, wherein the mounting component comprises a stationary housing.

9. An apparatus for rotationally fixing a seal ring of a mechanical seal assembly retained at a mounting component to be axially movable, comprising a force transmitting ring retained at the mounting component to be axially movable and a rotation prevention device comprising at least one first engaging member configured to engage with the mounting component and the force transmitting ring in a form-fit manner and at least one second engaging member configured to engage with the force transmitting ring and the seal ring in a form-fit manner, the first engaging member being arranged circumferentially offset with respect to the second engaging member, wherein the first engaging member protrudes axially from the seal ring towards the force transmitting ring and is configured to be received in an axial recess provided in the force transmitting ring with a play, and the second engaging member protrudes axially from the force transmitting ring towards the seal ring and is configured to be received in an axial recess provided in the seal ring with a play, the first engaging member is configured to be received simultaneously in axially aligned recesses in the force transmitting ring and the seal ring.

* * * * *